(12) United States Patent
Wang

(10) Patent No.: US 10,413,028 B2
(45) Date of Patent: Sep. 17, 2019

(54) MOBILE DEVICE CASE FOR WET ENVIRONMENTS

(71) Applicant: Steven Wang, Windham, NH (US)

(72) Inventor: Steven Wang, Windham, NH (US)

( * ) Notice: Subject to any disclaimer, the term of this patent is extended or adjusted under 35 U.S.C. 154(b) by 0 days.

(21) Appl. No.: 15/875,704

(22) Filed: Jan. 19, 2018

(65) Prior Publication Data
US 2018/0206608 A1   Jul. 26, 2018

Related U.S. Application Data

(60) Provisional application No. 62/448,856, filed on Jan. 20, 2017.

(51) Int. Cl.
| *A45C 11/22* | (2006.01) |
| *H04B 1/3888* | (2015.01) |
| *G03B 17/14* | (2006.01) |
| *H04M 1/02* | (2006.01) |
| *H04M 1/18* | (2006.01) |
| *G03B 17/08* | (2006.01) |
| *G03B 17/56* | (2006.01) |
| *A45C 11/00* | (2006.01) |
| *H04B 1/38* | (2015.01) |

(52) U.S. Cl.
CPC .............. *A45C 11/22* (2013.01); *A45C 11/00* (2013.01); *G03B 17/08* (2013.01); *G03B 17/14* (2013.01); *G03B 17/56* (2013.01); *H04B 1/3888* (2013.01); *H04M 1/0202* (2013.01); *H04M 1/18* (2013.01); *A45C 2011/002* (2013.01); *A45C 2011/003* (2013.01); *H04B 2001/3894* (2013.01); *H04M 1/0264* (2013.01)

(58) Field of Classification Search
CPC . A45C 11/22; A45C 13/008; A45C 2011/002; Y10S 206/811; Y10S 224/934; H04B 2001/3894; H04B 1/3888; G03B 17/08; H04M 1/0249; H04M 1/0254; H04M 1/0252
See application file for complete search history.

(56) References Cited

U.S. PATENT DOCUMENTS

| D318,663 | S | 7/1991 | Frisinger |
| D357,664 | S | 4/1995 | Lupo |
| 5,845,803 | A * | 12/1998 | Saito ........................ H05K 5/06 220/378 |
| D453,177 | S | 1/2002 | Uehara |

(Continued)

FOREIGN PATENT DOCUMENTS

GB       2505889 A  *  3/2014  ............. A45C 11/00

*Primary Examiner* — Devan A Sandiford
(74) *Attorney, Agent, or Firm* — Lando & Anastasi, LLP

(57) ABSTRACT

A mobile device case is disclosed. The mobile device case includes a body portion and a bottom portion. One portion includes a gasket configured to sealingly contact both the body portion and the bottom portion. The body portion and the bottom portion include mating curved surfaces. The gasket is a curved gasket that mates with the curved surfaces of the body portion and the bottom portion. The body portion and the bottom portion include a connection arrangement configured to releasably connect the body portion to the bottom portion. The connecting arrangement includes at least a first locking arrangement disposed in part on the first side of the body portion and the first side of the bottom portion.

30 Claims, 12 Drawing Sheets

(56) References Cited

U.S. PATENT DOCUMENTS

| | | |
|---|---|---|
| 6,646,864 B2 | 11/2003 | Richardson |
| 6,995,976 B2 | 2/2006 | Richardson |
| 7,230,823 B2 | 6/2007 | Richardson et al. |
| D560,216 S | 1/2008 | Takamori et al. |
| 7,609,512 B2 | 10/2009 | Richardson et al. |
| D621,393 S | 8/2010 | Panahi et al. |
| D623,652 S | 9/2010 | Hsu |
| 7,907,394 B2 | 3/2011 | Richardson et al. |
| D644,635 S | 9/2011 | Richardson et al. |
| D670,278 S | 11/2012 | Hamann |
| D683,338 S | 5/2013 | Wilson et al. |
| D686,604 S | 7/2013 | Nuovo et al. |
| D697,504 S | 1/2014 | Yang |
| D699,947 S | 2/2014 | To et al. |
| D700,778 S | 3/2014 | To et al. |
| 8,792,262 B2 | 7/2014 | Tailliet |
| D710,343 S | 8/2014 | Chandler, Jr. et al. |
| D710,611 S | 8/2014 | To et al. |
| D712,390 S | 9/2014 | Namminga |
| D714,275 S | 9/2014 | Tompkin |
| D714,769 S | 10/2014 | Rayner |
| D718,315 S | 11/2014 | Carpenter et al. |
| D722,312 S | 2/2015 | Tages et al. |
| D723,531 S | 3/2015 | Katzke |
| D728,548 S | 5/2015 | Keung |
| 9,086,610 B2 | 7/2015 | Shoemake et al. |
| 9,114,923 B2 | 8/2015 | Richardson et al. |
| 9,170,690 B2 | 10/2015 | Chu |
| 9,172,781 B1 | 10/2015 | Goldstein |
| D758,358 S | 6/2016 | Mao et al. |
| 9,370,230 B1* | 6/2016 | So .......................... A45C 11/00 |
| 9,392,854 B2* | 7/2016 | Fathollahi ............... A45C 11/00 |
| 9,462,099 B2* | 10/2016 | Wilson ................... H04M 1/185 |
| 9,537,526 B2* | 1/2017 | Wilson ..................... H04M 1/18 |
| 9,864,257 B1* | 1/2018 | Wroblewski ........... G03B 17/04 |
| 2003/0196917 A1* | 10/2003 | Broadhead .......... E05B 73/0023 |
| | | 206/308.2 |
| 2006/0274493 A1* | 12/2006 | Richardson ........... G06F 1/1626 |
| | | 361/679.4 |
| 2009/0032420 A1 | 2/2009 | Zenzai |
| 2011/0147245 A1 | 6/2011 | Yim |
| 2012/0262618 A1 | 10/2012 | Weakly |
| 2013/0294020 A1* | 11/2013 | Rayner ................... H05K 5/061 |
| | | 361/679.01 |
| 2013/0322013 A1* | 12/2013 | Steele ..................... A45C 11/00 |
| | | 361/679.55 |
| 2014/0028243 A1* | 1/2014 | Rayner ................... G06F 1/163 |
| | | 320/103 |
| 2014/0152890 A1* | 6/2014 | Rayner ................. G06F 1/1626 |
| | | 348/376 |
| 2014/0226268 A1* | 8/2014 | O'Neill ................... G03B 15/06 |
| | | 361/679.01 |
| 2014/0246339 A1* | 9/2014 | Chung ................. H04B 1/3888 |
| | | 206/37 |
| 2014/0262847 A1* | 9/2014 | Yang ...................... A45C 11/00 |
| | | 206/37 |
| 2014/0268517 A1 | 9/2014 | Moon et al. |
| 2014/0339104 A1* | 11/2014 | Magness ................ A45C 11/00 |
| | | 206/37 |
| 2014/0353178 A1* | 12/2014 | Kim ....................... B65D 25/54 |
| | | 206/37 |
| 2014/0353179 A1* | 12/2014 | Kim ....................... A45C 11/00 |
| | | 206/37 |
| 2014/0360892 A1* | 12/2014 | Lin ......................... A45C 11/00 |
| | | 206/37 |
| 2015/0062787 A1* | 3/2015 | Wilson ................... H04M 1/185 |
| | | 361/679.01 |
| 2015/0189963 A1* | 7/2015 | Lai ......................... A45C 13/008 |
| | | 224/191 |
| 2015/0194997 A1* | 7/2015 | Johnson ............... H04B 1/3888 |
| | | 455/575.8 |
| 2015/0201723 A1* | 7/2015 | Rayner ................. G06F 1/1601 |
| | | 224/191 |
| 2015/0335114 A1* | 11/2015 | Stammbach ........... A45C 11/00 |
| | | 224/191 |
| 2016/0021998 A1* | 1/2016 | Fathollahi .............. A45C 11/00 |
| | | 224/191 |
| 2016/0323506 A1* | 11/2016 | Laird ................. H04N 5/23245 |
| 2017/0163305 A1* | 6/2017 | Bao ........................ A45C 11/00 |
| 2018/0152217 A1* | 5/2018 | Laird ................. H04N 5/23245 |

* cited by examiner

MOBILE DEVICE CASE FOR WET ENVIRONMENTS

RELATED APPLICATION

This application claims the benefit of and priority to U.S. provisional application No. 62/448,856, filed Jan. 20, 2017, titled "MOBILE DEVICE CASE FOR WET ENVIRONMENTS," the entirety of which is incorporated by reference herein.

BACKGROUND

(1) Field

This disclosure relates to a case for a mobile device suitable for use in a wet environment or underwater or for additional protection from dust, debris, spills and other elements.

(2) Description of the Related Art

There is an ever-increasing prevalence of mobile devices being used in many activities. A growing variety of mobile devices include cameras. It would be desirable to use such mobile devices in wet environments or underwater. However many such devices are not compatible with water, and must be kept dry, or are unable to resist water below a certain depth. Therefore there remains a need for products which allow the use of mobile devices in wet environments or underwater.

SUMMARY

Disclosed are aspects of an embodiment of a mobile device case comprising a body portion and a bottom portion including a gasket configured to sealingly contact both the body portion and the bottom portion. The body portion and the bottom portion include a connection arrangement configured to connect at least a first side of the body portion to a first side of the bottom portion. The connecting arrangement includes at least a first locking arrangement disposed in part on the first side of the body portion and the first side of the bottom portion. The locking arrangement includes a clasp configured to hold the top portion and the bottom portion in a closed configuration.

Disclosed are aspects of an embodiment of a mobile device case comprising a body portion and a bottom portion including a gasket configured to sealingly contact the body portion and the bottom portion. The body portion and the bottom portion can include a hinge arrangement configured to hingedly connect a first side of the body portion to a first side of the bottom portion. The body portion and the bottom portion can include a locking arrangement disposed on a second side of the body portion, the locking arrangement including a clasp configured to hold the top portion and the bottom portion in a closed configuration. Alternatively, in some embodiments, the body portion can include a locking arrangement on both sides (no hinge) that is configured to mate and connect with a portion of the arrangement on both sides of the bottom portion.

Disclosed are aspects of an embodiment of a mobile device case comprising a body portion and a curved bottom portion including a curved gasket configured to sealingly contact the body portion and the bottom portion. The body portion and the curved bottom portion can include a hinge arrangement configured to hingedly connect a first side of the body portion to a first side of the curved bottom portion. The body portion and the curved bottom portion can include a locking arrangement disposed on a second side of the body portion, the locking arrangement including a clasp configured to hold the top portion and the bottom portion in a closed configuration. Alternatively, in some embodiments, the body portion can include a locking arrangement on both sides (no hinge) that is configured to mate and connect with a portion of the arrangement on both sides of the bottom portion.

Disclosed are aspects of an embodiment of a mobile device case comprising a body portion having a curved portion and a bottom portion having a mating curved portion and further including a curved gasket configured to sealingly contact the curved portion of the body portion and the curved portion of the bottom portion. The body portion and the bottom portion including at least a first locking arrangement disposed in part on a first side of the body portion and a first side of the curved bottom portion and configured hold a first side of the body portion and a first side of the bottom portion in a closed configuration. The body portion and the curved bottom portion including second locking arrangement disposed in part on a second side of the body portion and a second side of the curved bottom portion, the second locking arrangement including a clasp configured to hold the top portion and the bottom portion in a closed configuration.

Any of the embodiments can also be provided with a mobile device.

Aspects of at least one embodiment include that the body portion includes a curved portion and the bottom portion comprises a mating curved portion. Aspects of at least one embodiment include that the gasket is a curved gasket.

Aspects of at least one embodiment include that the connection arrangement comprises a hinge arrangement on a second side of the bottom portion and a second side of the body portion. Aspects of this embodiment include that the first locking arrangement and the hinge provide for the bottom portion to be removably attached to the body portion.

Aspects of at least one embodiment include that the connection arrangement comprises a second locking arrangement on a second side of the bottom portion and second side of the body portion. Aspects of this embodiment include that the first locking arrangement and the second locking arrangement provide for the bottom portion to be removably attached to the body portion.

Aspects of at least one embodiment include that the gasket comprises a substantially flat gasket.

Aspects of at least one embodiment include that at least one of the body portion and the bottom portion comprises a polycarbonate.

Aspects of at least one embodiment include that the at least one of the body portion and the bottom portion comprises an acrylonitrile-butadiene-styrene polycarbonate blend.

Aspects of at least one embodiment include that the gasket is a curved gasket configured to fluidly seal the top portion and the bottom portion and that the connection arrangement in combination with the body portion, the bottom portion and the curved gasket are configured to maintain a watertight seal to a depth of at least 2 meters.

Aspects of at least one embodiment include that the gasket is a curved gasket configured to fluidly seal the top portion and the bottom portion and that the connection arrangement in combination with the body portion, the bottom portion and the curved gasket are configured to maintain a watertight seal to at least a depth of 30 meters.

Aspects of at least one embodiment include that the body portion further comprises at least one button that is configured to movably protrude into the body portion. Aspects of this embodiment include that the button further comprises a biasing member, which biases a position of the button between a rest position and an actuated position. Aspects of this embodiment includes that the biasing member is a spring. Aspects of this embodiment include that the button comprises a compliant cover.

Aspects of at least one embodiment include that the first locking arrangement is configured to lock the clasp in a closed position.

Aspects of at least one embodiment include a flange disposed on a side of the device case.

Aspects of at least one embodiment include a lens mount on the body portion. Aspects of this embodiment include a removable optical lens configured to be removably attachable to the lens mount.

Aspects of this embodiment include that the first locking arrangement and the second locking arrangement provide for the bottom portion to be removably attached to the body portion.

Aspects of at least one embodiment include a bracket sized and configured to securely hold the mobile device. Aspect of this embodiment include that the bracket is sized and configured to position a screen of a mobile device disposed in the body portion adjacent an inner surface of a film layer in the body portion. Aspects of this embodiment include that the film layer is a thin film layer that is configured to allow a user to interact with a mobile device through the thin film layer. Aspects of this embodiment include that the film layer is a thick film layer that is configured to use the mobile device case to up to 30 meters. Aspects of this embodiment include that the bracket is configured with rods and the bottom portion of the device case is configured with mating holders, so that the bracket is removably connectable and disconnectable from the bottom portion.

Disclosed are aspects of an embodiment of a method of operating a mobile device with any of the disclosed embodiments of the mobile device case, the method comprising disposing a mobile device in a bracket of the mobile device case and operating the device through a film layer of the body portion of the mobile device case.

Disclosed are aspects of an embodiment of a method of operating a mobile device with any of the disclosed embodiments of the mobile device case, the method comprising providing the device case with at least one button that is arranged to be aligned with a volume button of the mobile device and that is configured to movably protrude into the body portion, the button further comprises a biasing member that biases a position of the button between a rest position and an actuated position, and actuating the button of the device case to actuate a volume button of the mobile device.

Disclosed are aspects of an embodiment of a method of operating a mobile device with any of the disclosed embodiments of the mobile device case, the method comprising closing the device case to form a water tight mobile device case, wherein the closing the device case comprises positioning the bottom portion in a closed position with respect to the body portion and positioning the clasp of at least the first locking assembly in a closed position.

Disclosed are aspects of an embodiment of a method of operating a mobile device with any of the disclosed embodiments of the mobile device case, the method comprising submerging the closed mobile device case including a mobile device underwater and operating the mobile device.

With any of these arrangements of a mobile device case, mobile devices can be used in wet environments or underwater and the mobile device case can also provide protection from dust, debris, spills, and from the mobile device coming into contact with any harsh elements.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Mobile devices often include sensors, touch-sensitive screens, and other electronic components that are sensitive to damage from their environment, such as from liquids such as water coming in contact with the mobile device. Disclosed is a mobile device case that allows use of a mobile device in a wet or underwater or otherwise incompatible environment that provides protection from dust, debris, spills, and from the mobile device coming into contact with elements without damage to the device. In an embodiment, a device may be placed inside a cavity of a body portion of mobile device case and a bottom cover portion of the mobile device case is closed in sealing engagement with the body portion form a water-tight seal, thereby allowing for use of the device in a wet or harsh environment and/or protection from dust, debris, spills and other elements without damage to a mobile device. This is beneficial because the case protects the device from everyday elements such as spills and mishaps, and further allows for use of the device underwater, e.g., to take photographs or videos underwater.

Disclosed is a mobile device case comprising a body portion and a bottom portion, wherein at least one of the body portion and the bottom portion comprises a sealing gasket configured to sealingly contact the body portion and the bottom portion, a connection arrangement to attach the bottom portion to the body portion, and a lock comprising a clasp, which is configured to secure the bottom portion to the body portion in a closed configuration to fluidly seal the mobile device case so that it can be used underwater and protect it from every day elements. In some embodiments, the connection arrangement can include a hinge. In other embodiments, the connection arrangement includes a locking arrangement.

Figure 1:
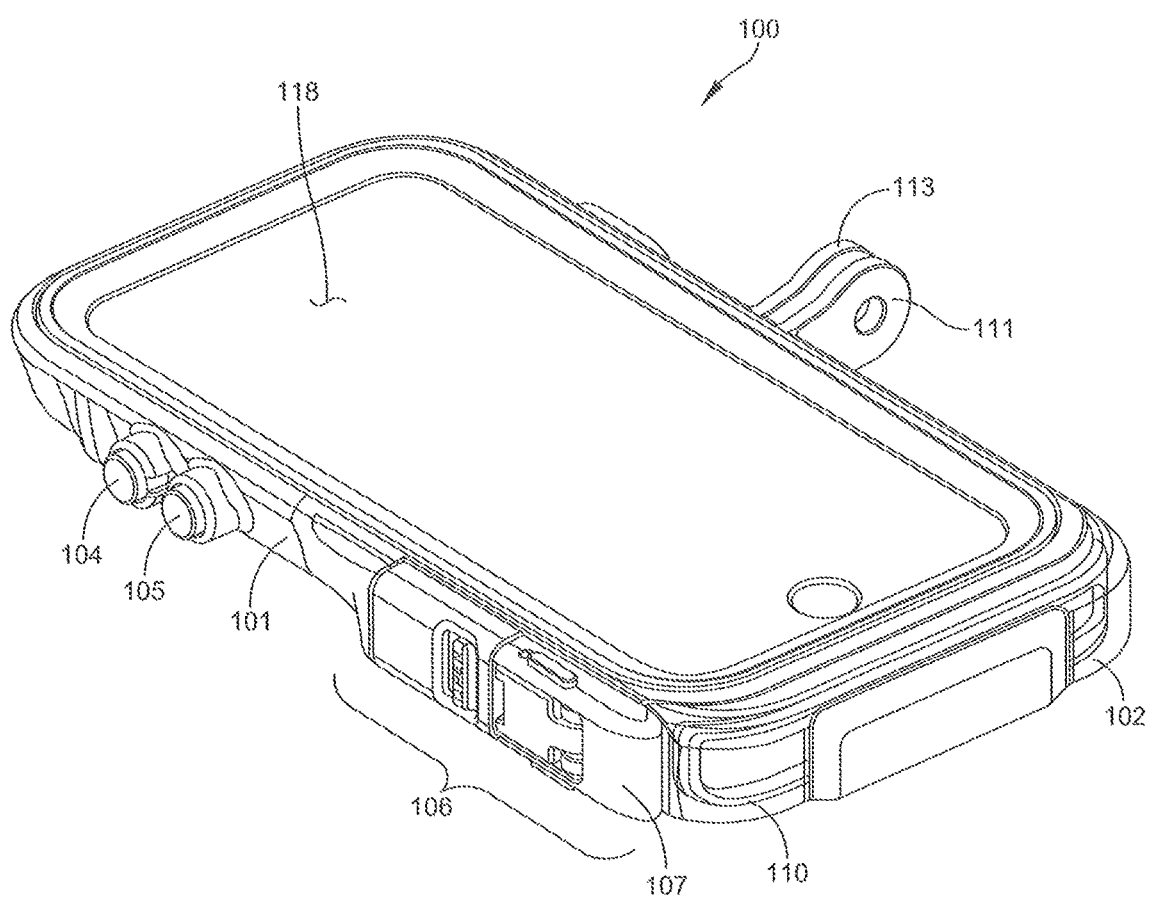
FIG. 1 is a top perspective view of an embodiment of a device case in a closed configuration.

An embodiment of the device case is shown in the various views of FIGS. 1 to 5. The device case 100 includes a top portion 101 and a bottom portion 102 for containing a mobile device in a cavity provided by the top and bottom portions. A lock 106 is provided on at least one of the body portion 101 and the bottom portion 102 to secure the bottom portion 102 to the body portion 101 in a closed configuration. The lock 106 has an open configuration (See FIGS. 2-3) and a closed configuration (See FIG. 1). The lock 106 includes a clasp 107 that is movable between a latched position (closed configuration of the lock) and an unlatched position (open position of the lock). In the closed configuration of the lock 106, the clasp 107 is in a closed position and secures the bottom portion 102 to the body portion 106. Referring to FIG. 1, the lock can be opened by a user by first disengaging the clasp 107 by moving a tab 109 upward to the open position to unlatch the clasp, before moving the clasp to an open position (See FIG. 2).

In one embodiment, a hinge 108 having portions on at least one side of the body portion 101 and a side of the bottom portion 102 hingedly connects the body portion 101 and the bottom portion 102 to allowed for hinged opening and closing of the bottom portion (See FIG. 2) with respect to the body portion 101. As shown in FIG. 3, a portion of the hinge on the bottom portion 102 can also be disengaged from a portion of the hinge on the body portion 101, so that the bottom portion 102 can also be completely removed from engagement with body portion with the clasp 107 and the lock 106 in the open configuration. It is appreciated that although a hinge arrangement is illustrated in at least one embodiment of the mobile device case, the hinge could also be replaced with alternate connecting structures such as, for example, a pivot or any other connecting structure used in the art. In an embodiment, the lock 106 is disposed at least in part on one side of the body portion and one side of the bottom portion opposite the hinge arrangement 108, as shown in FIGS. 1 to 4. Thus, the bottom portion 102 can be attached via a combination of a hinge arrangement 108 and the lock 106. The bottom portion 102 can also be completely removable.

Figure 8:
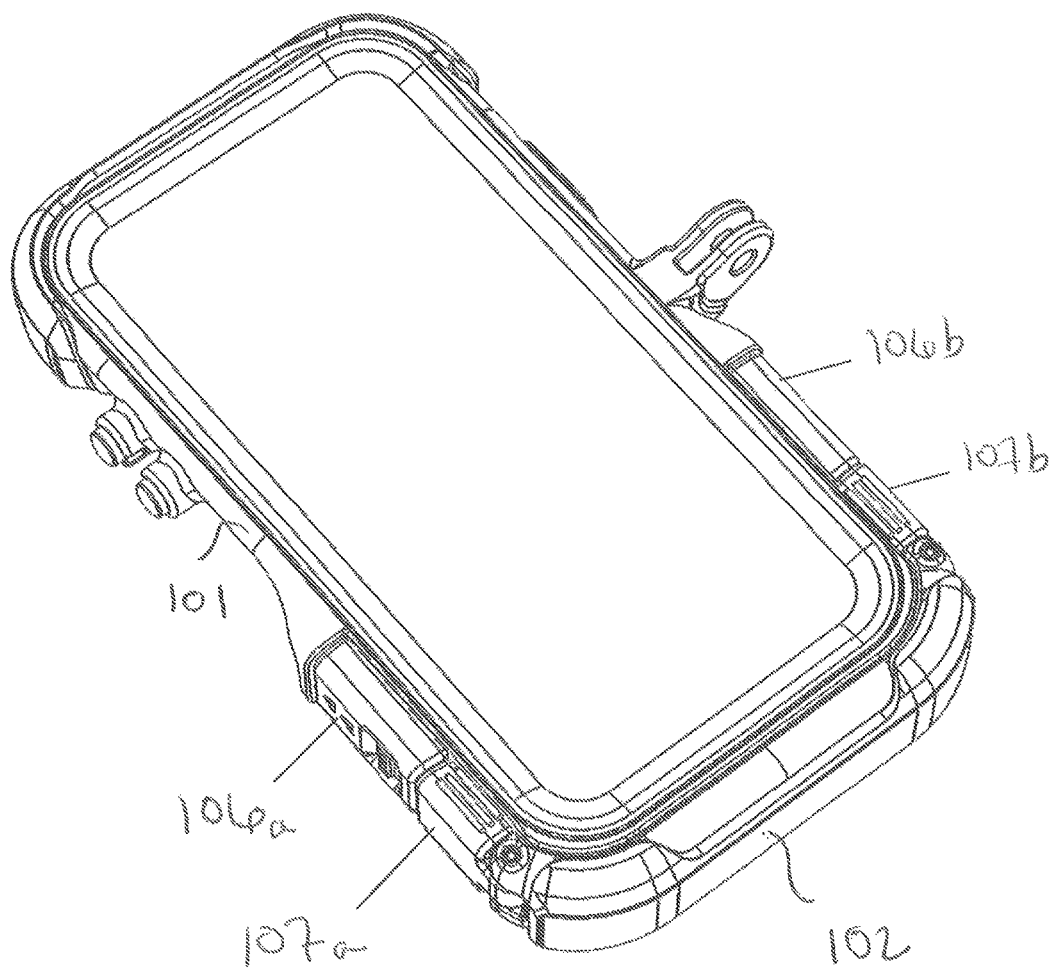
FIG. 8 is a top perspective view of another embodiment of a device case in a closed configuration.
Figure 9:
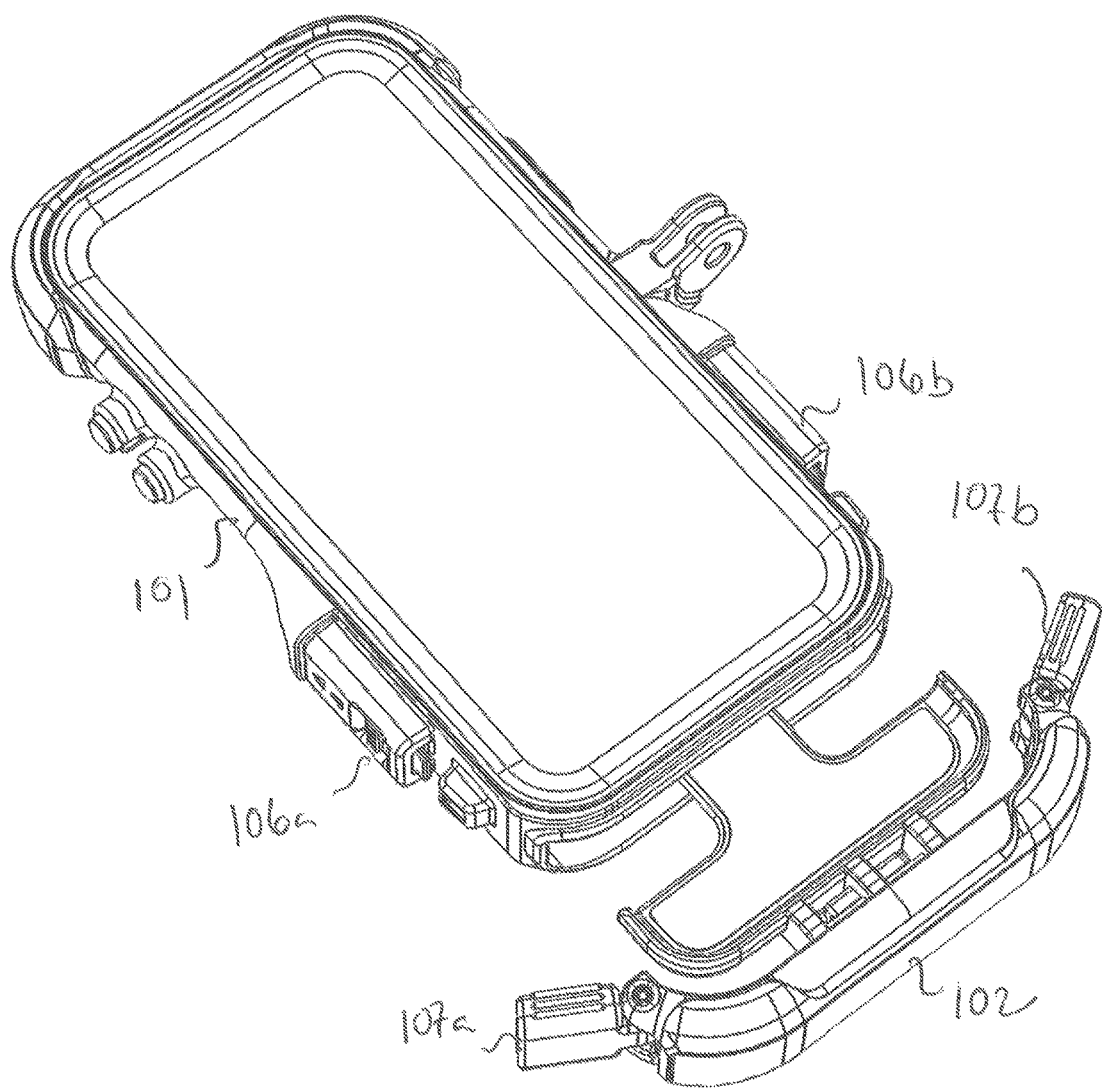
FIG. 9 is a top perspective view of the embodiment of the device case of FIG. 8 in an open configuration.

Referring to FIG. 8, in another embodiment, there are two locking arrangements connecting the bottom portion 102 to the top portion 101 (with no hinge arrangement). As shown in FIG. 9, the bottom portion 102 can be disengaged from the body portion 101 at both locking arrangements 106a, 106b, so that the bottom portion 102 can also be completely removed from engagement with body portion with the clasps 107a, 107b in the open position, so that the locks 106a, 106b are in the open configuration. In this embodiment, lock 106a is disposed at least in part on one side of the body portion and one side of the bottom portion, and lock 106b is disposed on the opposite side of the body portion and bottom portion. Thus, the bottom portion 102 can be attached via a combination of two locking arrangements 106a, 106b. The bottom portion 102 can also be completely removable.

Figure 2:
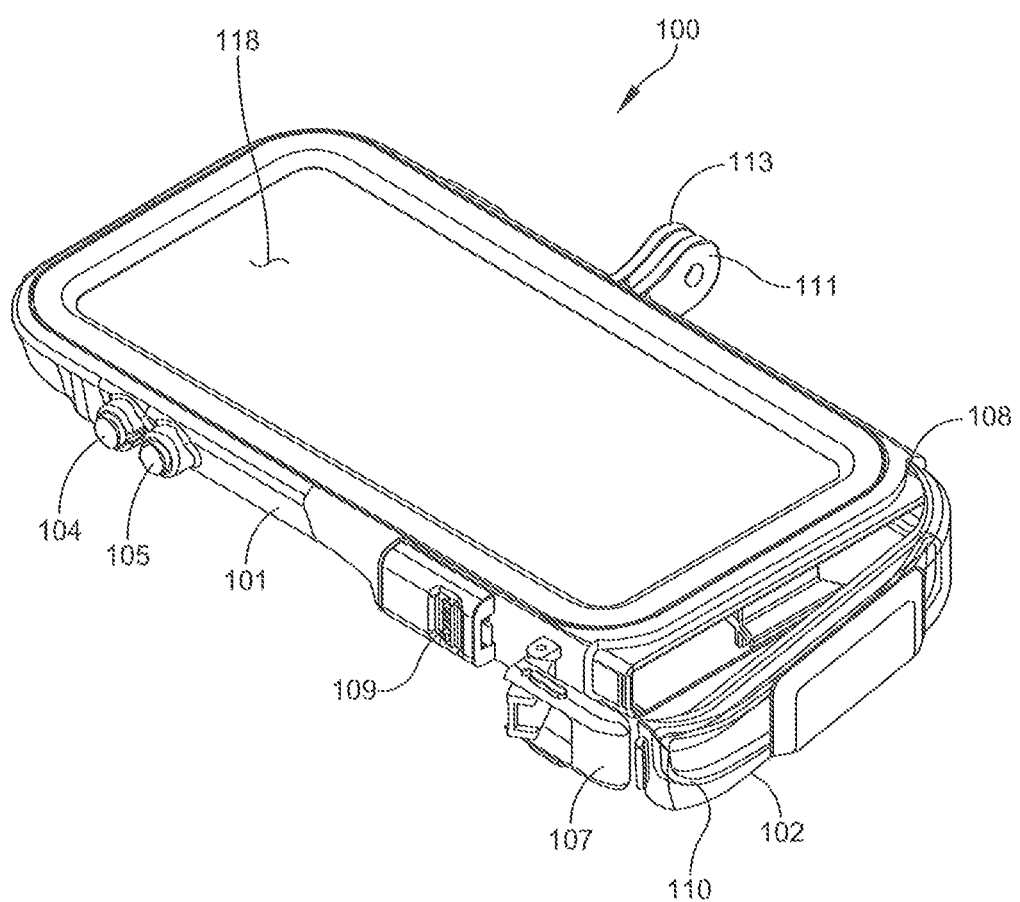
FIG. 2 is a top perspective view of an embodiment of a device case in a partially open configuration.
Figure 3:
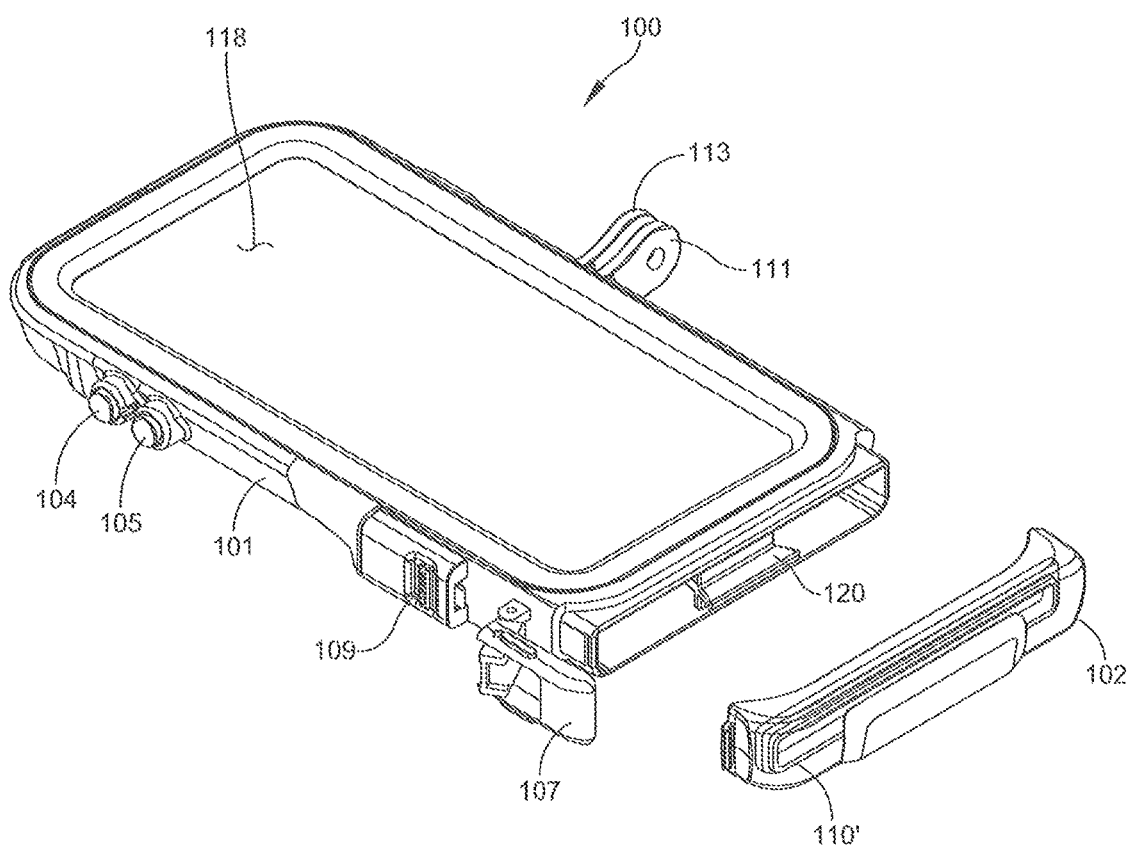
FIG. 3 is a perspective view of an embodiment of a device case in a fully open configuration.

Referring to FIGS. 1-2, the mobile device case also includes a curved gasket or seal 110 located in the bottom portion 102. The curved gasket or seal provides a fluid tight seal between the bottom portion 102 and the body portion 101. The curved gasket, coupled with the lock 106 and the hinge 108 (the locking system) or two locks 106a, 106b (no hinge) in combination provide for the curved gasket to put pressure on all areas of the gasket to provide a fluid tight seal between the body portion 102 and the bottom portion with the lock 106 in the closed position. An advantage of the locking system and the curved gasket is that the pressure created by the locking system is distributed over the entire curved gasket 110, not just a portion of the gasket 110. Another advantage of the curved gasket or seal 110 of the case of this disclosure is the small size of the seal and the small area that needs to be sealed. Referring to FIG. 3, it is appreciated that although the curved gasket 110 is illustrated in FIGS. 1-2 as curved to align with the curved shape of the bottom portion 101, the gasket 110' (See FIG. 3) can also be generally planar (flat) so long as the body portion 101 and the bottom portion 102 have a generally planar interface where they meet to accommodate a planar gasket. Such a gasket will still have at least some of the advantages noted above.

The curved gasket 110 or the planar gasket 110' provides an advantage over other seals that are typically provided in other mobile device cases, such as a case that has a bottom half and a top half and that is hinged to open in a clam shell like manner. With such an arrangement, a gasket must be placed around an entire periphery of one half of the case along either the top section or bottom section of the case to create a seal between the top section and the bottom section of the case. A problem with such an arrangement is the need to create and distribute a sealing pressure evenly and strong enough at all points of the two halves of the case to create a tight seal between the top half and the bottom half of the case so that the case can be used in wet environments. It is appreciated that if the pressure is not consistent around the entire periphery of the case, than the seal will be weak (will only be as good as its weakest point). As can be appreciated, forcing pressure on one area of the phone case does not create a better seal on another section of the phone case.

According to aspects of the mobile device case of this disclosure, the gasket is configured to provide a watertight seal The gasket may be configured to maintain a watertight seal between the body portion 101 and bottom portion 102 over a range from any of a depth of 0 meters (i.e., splash protection) to a depth of 30 meters, a depth of 0.001 meter to a depth of 25 meters, a depth of 0.01 meter to a depth of 20 meters, a depth of about 0.1 meter to a depth of 15 meters, or a depth of about 0.5 meter to a depth of about 5 meters, when the device case 100 is in a closed configuration. In an embodiment, the gasket maintains a watertight seal between the body portion 101 and the bottom portion 102 to a depth of at least 30 meters when the device case is in a closed configuration.

The gasket 110, 110' may comprise any suitable material, and in an embodiment comprises a compliant or elastomeric material. Suitable materials for the gasket effectively prevent moisture, water, or other liquids from reaching the inner cavity of the device case when the device case is in a closed configuration. Representative materials for the gasket include a silicone, a nitrile, nitrile butadiene, a polyacrylate acrylic rubber, a flouroelastomer, a polyurethane, a polyethylene, a polypropylene, a polypropylene-ethylene propylene dienene monomer, a butadiene, a styrene butadiene, a chlorosulfonate, a neoprene, butyl rubber, ethylene propylene, an ethylene propylene dienene monomer rubber (EPDM), a polyisoprene, polybutadiene, chloroprene, or combination thereof. Silicone, or SANTOPRENE available from Exxon Mobil, and Milastomer available from Mitsu Chemicals, which are also referred to as thermoplastic vulcanizates, are mentioned.

Figure 5:
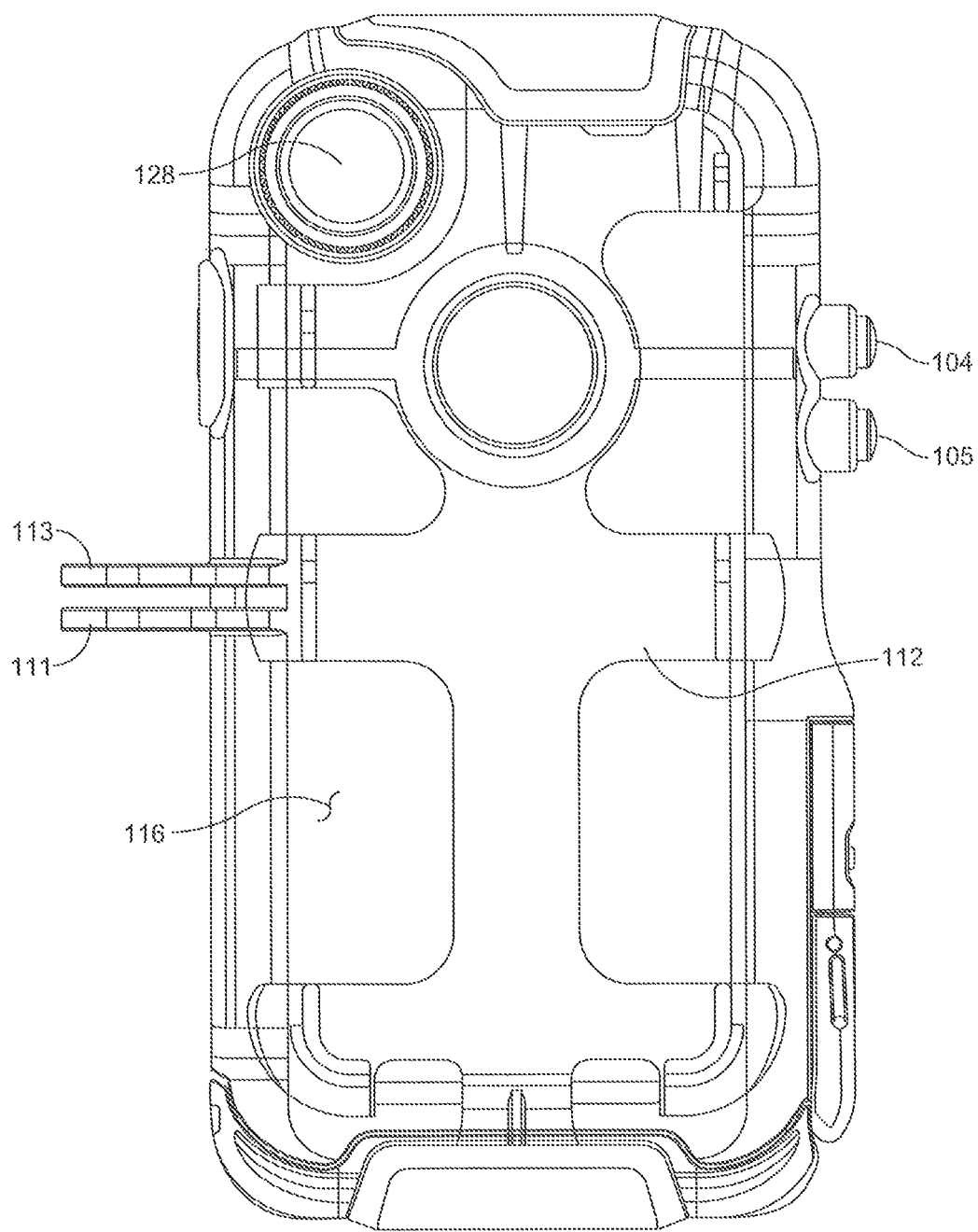
FIG. 5 is a rear view of the device case in a closed configuration.
Figure 6:
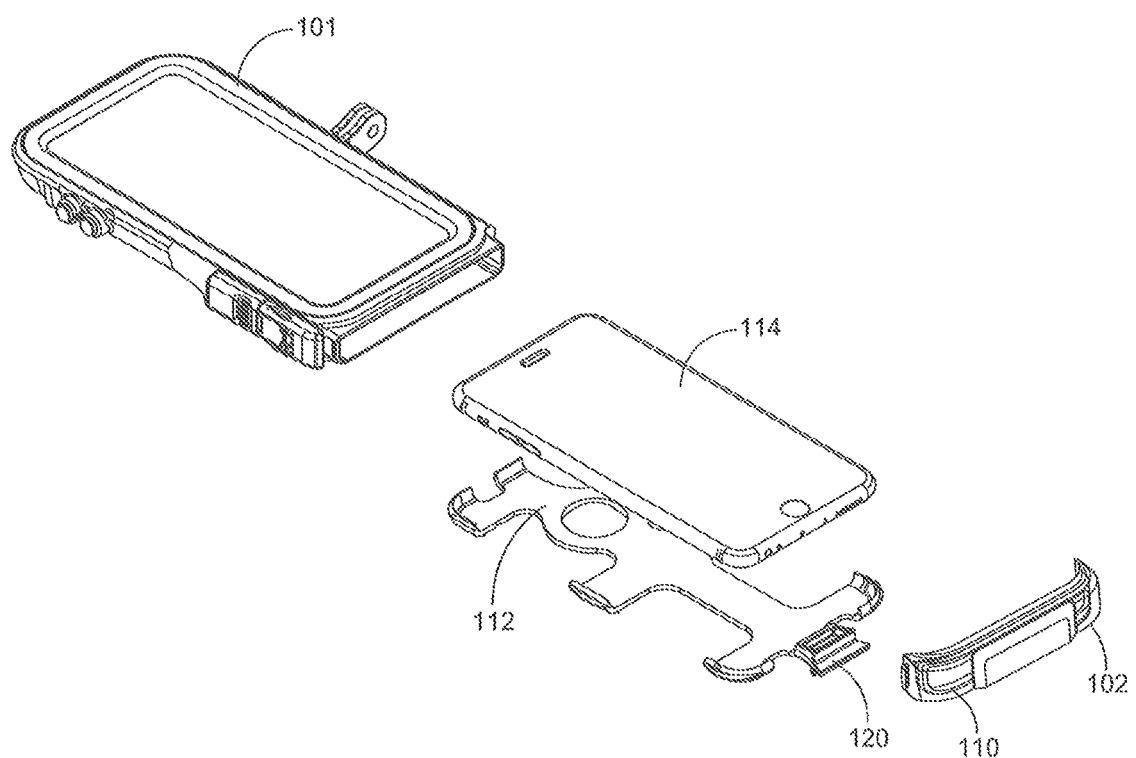
FIG. 6 is a perspective view of parts of a device case in an open configuration and illustrating mobile device insertion into a bracket and the device case.

Referring now to FIGS. 5-6, the mobile device case can also include a bracket 112. The bracket 112 is useful for creating a snug fit of a mobile device 114 within the mobile device case 100. This is achieved with a combination of the body portion having substantially enough room within the body portion for the mobile device 114 and for the bracket 112. The bracket 112 is sized and is configured to snugly hold the mobile device 114 (See FIG. 6). Thus, by placing the mobile device 114 in the bracket 112 and sliding the combination of the mobile device 114 and the bracket 112 into the body portion 101, the mobile device 114 is held in place within the body portion 101 by the bracket 112. In addition, the mobile device is snugly secured within the body portion 101 and is raised up at a higher position with respect to a back surface 116 of the body portion 101 than it would otherwise be if not for the bracket 112. The raised height of the mobile device 114 provided by the bracket provides for a screen of the mobile device to pressed against a clear film layer 118 of the body portion 101, which enables a user to interact with the screen of the mobile device 114 through the clear film layer 118. The bracket 112 is also useful to aid the user in pushing the mobile device 114 all the way into the body portion 101. In particular, a bottom portion 120 of the bracket 112 can be grabbed and used to push a combination of the bracket 112 and the mobile device 114 into the body portion 101 so that a top end of the bracket engages against an inner top portion of the body portion 101. The bottom portion 120 of the bracket 112 can also be used by a user to grab and pull the combination of the mobile device 114 and the bracket 112 out of the body portion 101. Without the bracket 112, inserting and removing the mobile device would be more difficult, the mobile device would not fit as snugly within the mobile device case 100 and a user would not be able to as easily and consistently interact with the screen of the mobile device 114 through the clear film layer 118.

Figure 10A:
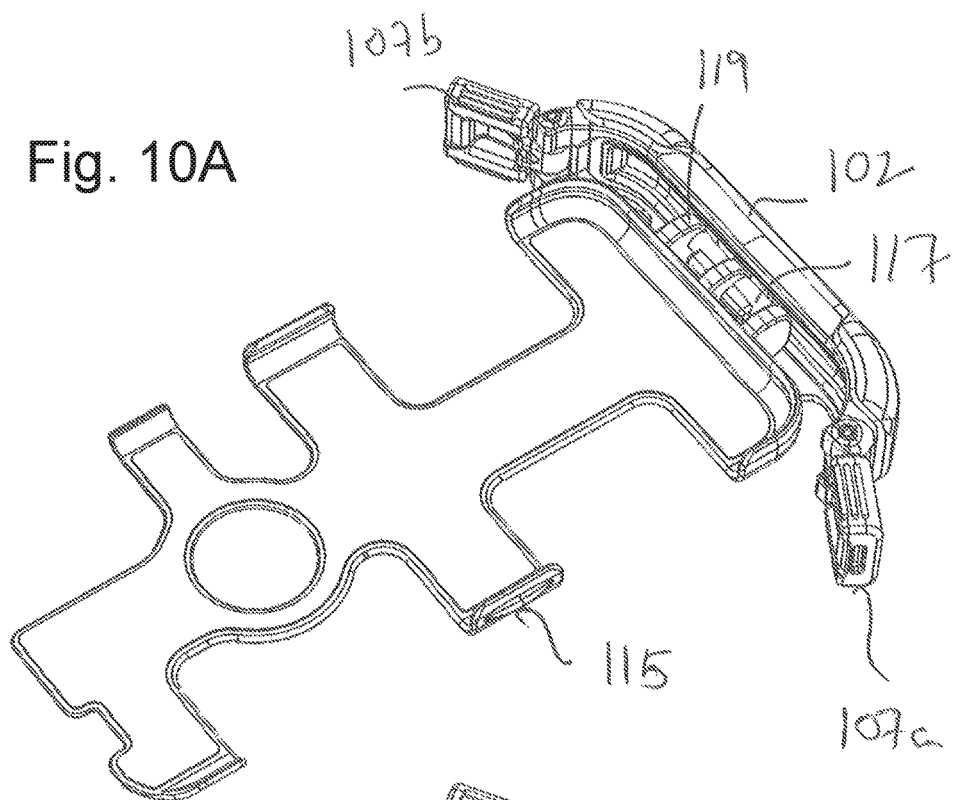
FIG. 10A-B illustrate a perspective view of the bottom portion of one embodiment of the device case having a bracket or tray that is removably attachable to the bottom portion of the device case in both the connected and disconnected arrangements.
Figure 10B:
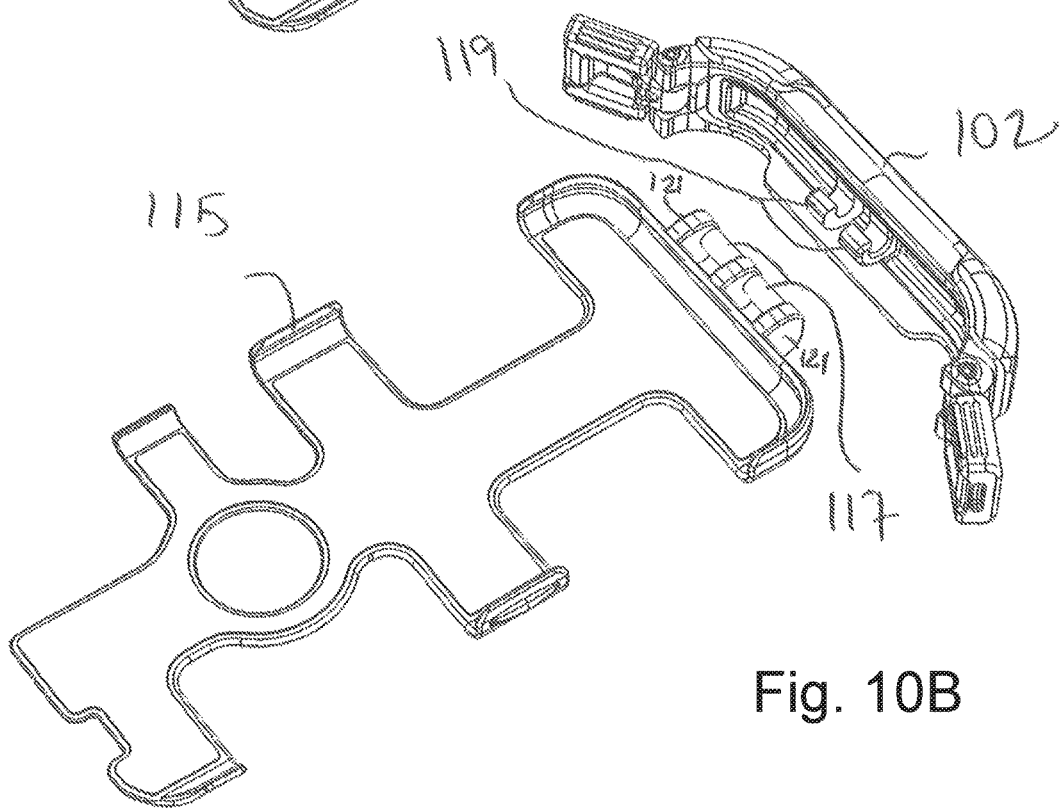

Referring now to FIGS. 10A-B, there is illustrated an alternative embodiment of the mobile device case bottom portion 102 and bracket (or tray) 115. This embodiment of the bracket 115 and bottom portion 102 includes at least one rod 117 (illustrated with two rods 117) connected to the bracket 115 by flanges 117. The at least one rod 117 is sized and arranged to mate with at least one holder 119 connected to the bottom portion 102 of the device case 100 so that the bracket 115 can be connected to and disconnected from the bottom portion 102. FIG. 10A illustrates the bracket 115 connected to the bottom portion 102 with the rods 117 held by the holders 119. FIG. 10B illustrates the bracket 115 detached from the bottom portion 102.

As noted, the bracket 115 is useful for creating a snug fit of a mobile device 114 within the body portion of 101 of the mobile device case 100. This is achieved with a combination of the body portion 101 having substantially enough room within the body portion for the mobile device 114 and for the bracket 115. The bracket 115 is sized and is configured to snugly hold the mobile device 114 (See FIG. 6). By placing the mobile device 114 in the bracket 115 and sliding the combination of the mobile device 114 and the bracket 115 into the body portion 101, the mobile device 114 is held in place within the body portion 101 by the bracket 115. In addition, the mobile device is snugly secured within the body portion 101 and is raised up at a higher position with respect to a back surface 116 of the body portion 101 than it would otherwise be if not for the bracket 115. The raised height of the mobile device 114 provided by the bracket provides for a screen of the mobile device to pressed against a clear film layer 118 of the body portion 101, which enables a user to interact with the screen of the mobile device 114 through the clear film layer 118. The bracket 115 connected to the bottom portion 102 of the device case is also useful to aid the user in pushing the mobile device 114 all the way into the body portion 101. In particular, with the bracket 115 connected to the bottom portion 102 of the device case, and the mobile phone inserted into the bracket 115, the bracket 115 and the phone 114 can be pushed into the body portion 101 so that a top end of the bracket engages against an inner top portion of the body portion 101. The bottom portion 102 of the device can also be used by a user to grab and pull the combination of the mobile device 114 and the bracket 115 out of the body portion 101. Without the bracket 115, inserting and removing the mobile device 114 would be more difficult, the mobile device would not fit as snugly within the body portion 101 of the mobile device case 100 and a user would not be able to as easily and consistently interact with the screen of the mobile device 114 through the clear film layer 118.

Figure 7A:
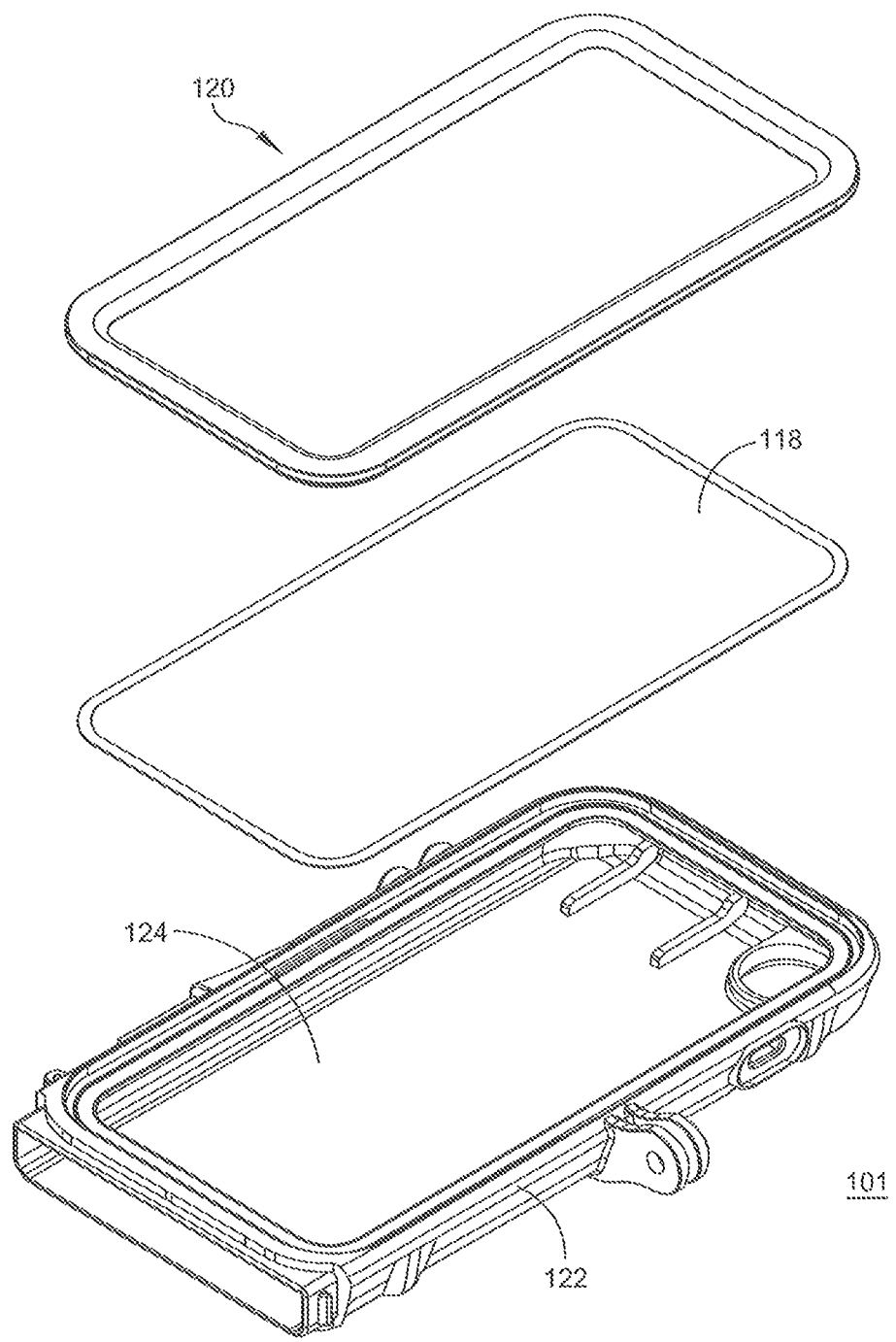
FIG. 7A is a perspective view showing a main body portion, a touch film layer, and a cover frame that comprise a body portion of the mobile device case.
Figure 7B:
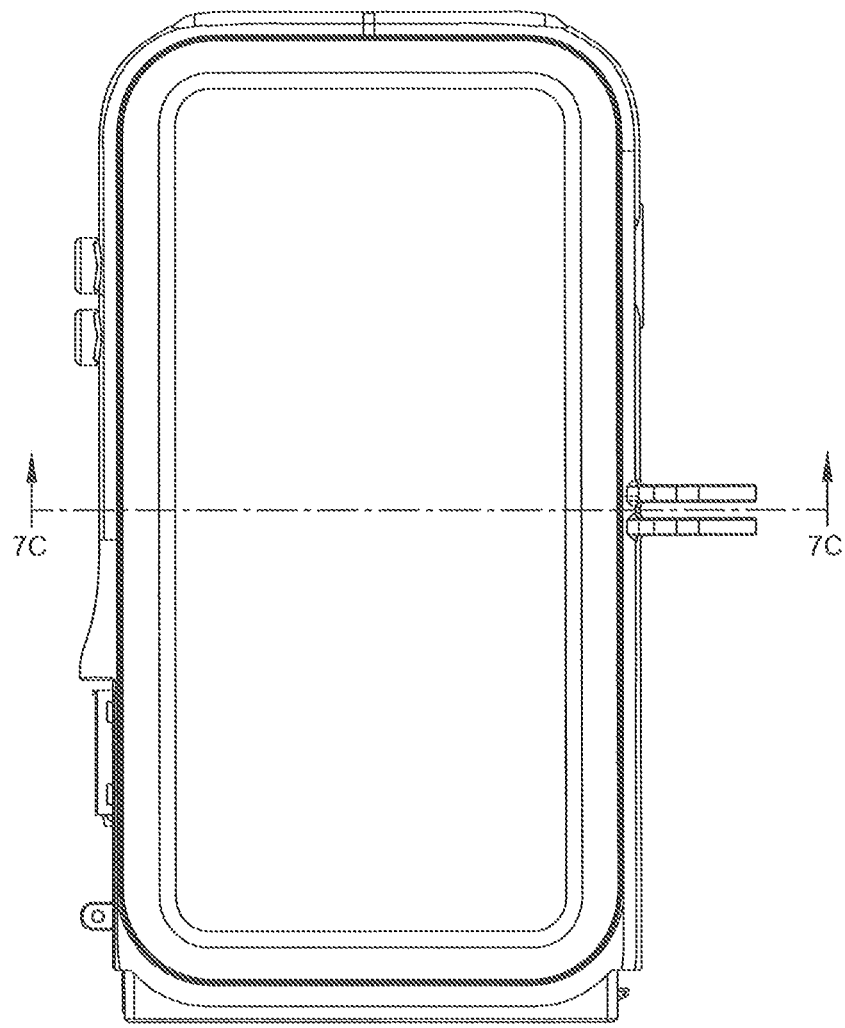
FIG. 7B is a front view showing a body portion of the mobile device case.
Figure 7C:
FIG. 7C is a cross-sectional view along line 7C-7C of FIG. 7B showing an aspect of how that the main body portion, the thin film touch layer, and the cover frame that comprise a body portion of the mobile device case are joined together-.
Figure 7D:
FIG. 7D is a cross-sectional view along line 7C-7C of FIG. 7B showing a thicker film touch layer.

Referring now to FIGS. 7A-7C, the body portion 101 includes a cover frame 120, a touch film or clear film layer 118 and the main body 122. The touch screen or plastic clear film 118 allows users to interact with the touchscreen of the phone or mobile device 114. Around this plastic clear film 118 is the cover frame 120, which can be, for example, a black plastic border. It can be seen that the body portion 101 comprises a window 124 disposed in the main body 122 of body portion 101. Referring to the cross-section view of FIG. 7C along line 7C-7C of front view of FIG. 7B, it is illustrated that the touch film 118 can be secured to main body 122 by a dual adhesive layer 130 placed above and below a border of the clear touch film layer. Alternatively, referring to the cross-section view of FIG. 7CD along line 7C-7C of front view of FIG. 7B, it is illustrated that the film 121 can be thicker than the thin film 118, which provides for the mobile device case to be used at even deeper dive depths than the thin film 118 can be, with the possible tradeoff being that the thicker film 121 may not provide the same user friendly interactable interface that the thin film 118 does (user can trade off deeper dive depths for potentially less ability to interact with the mobile device through the thicker film 121). The film 121 may be configured to maintain a watertight seal over a range from a depth of 0 meters (i.e., splash protection) to a depth of 30 meters. Once the touch film layer is secured to the main body 122, a sonic weld joint 132 can be created between the cover frame 120 and the main body 122 to seal the cover frame to the main body 122 to provide a watertight seal. Sonic welding of the plastic cover frame and the main body partially melts together the cover frame and the main body. This creates an air tight seal between the components that is resilient to extreme weather conditions and also to physical abuse. Typically, other phone cases use glue, tight fitting parts, and/or a rubber gasket to keep the clear plastic film in place. The sonic welding allows for a solid merging of at least some of the components of the mobile device case 100 that creates an extremely reliable sonic weld joint 132. Thus the combination of a dual adhesive layer 130 and the sonic weld joint 132 provide for a watertight seal between the cover frame 120, the touch film layer 118, 121 and the main body 122, which together comprise the body portion 101. It is also appreciated that the sonic weld methodology of sonic welding may be used to potentially sonic weld all three parts (the cover frame 120, the touch film 118, 121 and the main body). With such a methodology, the clear film layer would partially melt with the cover frame 120 to the main body 122.

The mobile device case 100 including the body portion 101 and the bottom portion 102 may comprise any suitable material, such as a metal, a polymeric material, or a combination thereof. Representative metals include aluminum, magnesium, steel such as corrosion resistant steel, titanium, or a combination thereof. Representative polymeric materials include acrylonitrile butadiene styrene (ABS), polypropylene, polyethylene, acetal copolymer, acrylic, nylon, polycarbonate, polyamide, polystyrene, polyvinyl chloride, and combinations thereof. A combination comprising at least one of the foregoing may be used. An acrylonitrile-butadiene-styrene polycarbonate blend is specifically mentioned. In an embodiment, at least one of the body portion 101 and the bottom portion 102 comprises a polycarbonate. In another embodiment at least one of the body portion 101 and the bottom portion 102 comprises an acrylonitrile-butadiene-styrene polycarbonate blend.

For appearance, and/or to accommodate for the more recent prevalence of mobile devices having multiple touch screens and/or visible indicators on multiple surface of the mobile device, in an embodiment of the mobile device case 100, the body portion 101 and the bottom portion 102 may comprise a transparent or optically clear material, for example to allow for viewing of additional screens or indicators. In such an embodiment, the body portion 101 and/or the bottom portion 102 may comprise a transparent material.

The clear film or touch film layer 118, 121 provides for visual and optional touch access to a display and/or touch screen of the mobile device 114. The clear film or touch film layer 118, 121 may comprise any suitable material for such use. In one embodiment, a transparent material is used. In an embodiment, the clear film 118 is a touch-screen compatible material. Representative polymeric materials for the touch screen include polycarbonate, acrylic, or combination thereof. A combination comprising at least one of the foregoing may be used. In one embodiment, a Polycarbonate is used. In an embodiment, the window comprises a touch sensitive plastic which allows for manipulation of and interaction with a touch-screen of the mobile device while fully enclosed in the mobile device case. It is also appreciated that although in one embodiment the touch screen is preferably a touch sensitive plastic, it can be any material typically used in the art including but not limited to, for example, a touch sensitive glass.

Figure 4:
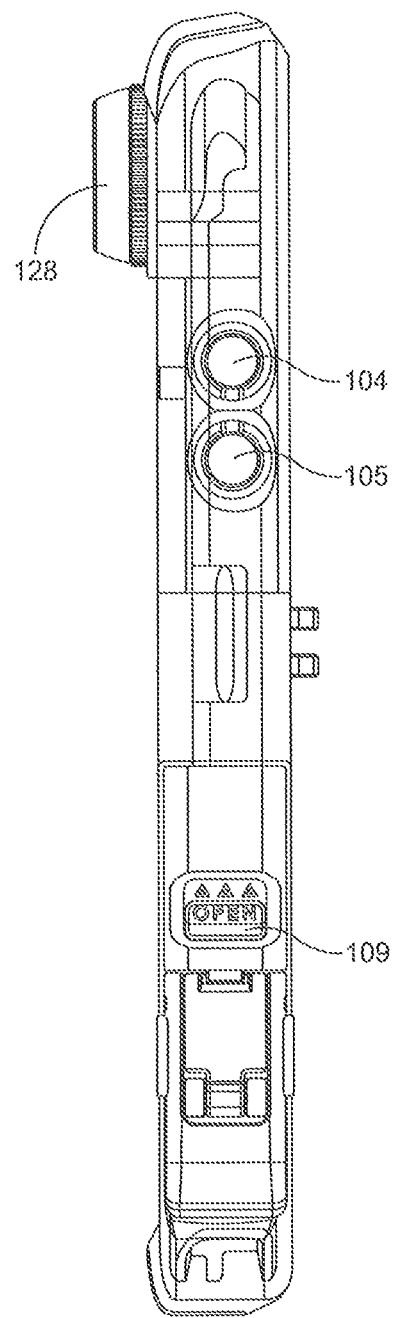
FIG. 4 is a left side view of an embodiment of the device case in a closed configuration.

Referring to FIGS. 4-5, an optical lens 128 is disposed on the body portion 101 of the device case 100. The optical lens of the device case may be disposed to be aligned with a camera of the mobile device. In a representative embodiment, the optical lens 128 is configured to provide a field of view over any of a range of 90 to 180 degrees, 100 to 170 degrees, or 110 to 160 degrees, 165 to 180°. The optical lens may be connected to the device case 100 with a lens mount to permit the use of exchangeable lenses, and thus the optical lens may be removably attached to body portion 101. In an embodiment, the optical lens may be colored, for example having a color which is selected to correct for a chromatic aberration. In an embodiment in which the device case is to be used underwater, the optical lens may have a color selected to compensate for the absorption of light in water.

Further, a flange is optionally disposed on the device case 100, e.g., on a right side of the device case 100, for attaching and securing the device case to another object, such as a bicycle, a mount such as a GoPro mount, or a submersible. A plurality of flanges may be provided. Illustrated in FIG. 1 is a device case comprising a first flange 111 and a second flange 113. A pin may engage the flange. For example, a pin may threadedly engage an aperture of the first flange 111 and/or the second flange 113.

Referring to FIGS. 1-5, at least one button 104, which is configured to actuate a contact of a mobile device 114 in the device case 100, is provided in the body portion 101. The button 104 is configured to sealingly extend or movably protrude into the body portion 101 when contacted to actuate a contact of a mobile device 114 disposed within the case 100. An embodiment in which 2 buttons 104, 105 are provided is specifically illustrated. As shown in FIGS. 1-5, an embodiment the mobile device case 100 comprises a first button 104 and a second button 105. Each button comprises a biasing member, e.g., a spring to bias the button between a rest position and an actuated position. Each button may further comprise at least one of a compliant cover, a plunger, a sleeve, and a seal.

In an embodiment in which the buttons align with volume buttons of the mobile device 114, actuating the buttons 104, 105 from a rest position to an actuated position causes a plunger of the button to contact the volume button. In an embodiment in which the devices is programmed so that the volume button controls a feature of the mobile device, such as the camera, depressing the button can result in actuation of the camera. In another embodiment, the device may be program so that the first volume button 104 scrolls through various features, and the second volume button 105 selects the feature. Accordingly, depressing a first button is aligned with the first volume button allows a user to select a feature when in a wet or harsh environment, and depressing the second button causes selection of the selected feature, such as actuating the camera for starting and stopping the camera for videography.

The material of the compliant cover and the seal may be independently selected, and each independently may comprise a silicone, a nitrile, nitrile butadiene, a polyacrylate acrylic rubber, a flouroelastomer, a polyurethane, a polyethylene, a polypropylene, a polypropylene-ethylene propylene dienene monomer, a butadiene, a styrene butadiene, a chlorosulfonate, a neoprene, butyl rubber, ethylene propylene, an ethylene propylene dienene monomer rubber (EPDM), a polyisoprene, polybutadiene, chloroprene, or combination thereof. The button may be configured to maintain a watertight seal over a range from a depth of 0 meters (i.e., splash protection) to a depth of 30 meters, a depth of 0.001 meter to a depth of 25 meters, a depth of 0.01 meter to a depth of 20 meters, a depth of about 0.1 meter to a depth of 15 meters, or a depth of about 0.5 meter to a depth of about 5 meters. In an embodiment, the button maintains a watertight seal to a depth of at least 30 meters, or to a depth of 2 meters.

Injection molding has been used to produce silicon and hard plastic phone cases. Dual injection molding has also been used for mobile device cases that have a hard plastic and a softer material combined in one case. Silicone phone cases can be produced by pressing into a mold or using injection molding Thus, it is typical for a mobile device case product to be produced by tools that inject a plastic into a mold where it's pressed into shape. What is produced are typically top half and bottom half pieces that can be attached by a combination of glue, rubber, clamps, and/or hinges. As has been noted herein, this can create problems in sealing the two halves together with a seal that must be placed around an entire periphery of the halves of the case, due to need to apply pressure around the entire periphery to keep a tight seal.

Also disclosed herein is a method of manufacturing the mobile phone case 100. A tool insert method is disclosed. According to the one embodiment, a tool insert method is used where a first tool is provided and the mobile device case to be manufactured is formed around the first tool. The tool insert method includes two additional tools that are pressed together creating a cavity having an outer shape of the mobile device case within the cavity formed between the two additional tools. The first tool that fits within the cavity or expands to fit within the cavity is placed between the two additional tools. A material is injected between and around the tools to create the portions of the mobile device case 100.

For the disclosed embodiment of the mobile device case, the body portion 101 can be manufactured using this method as a single piece and the bottom portion can be manufactured using this method as a single piece. In particular, a first tool is moved, for example 4-6 inches into a mold between the additional tools, and a single piece body portion is extruded from plastic that quickly cures. The single body portion 101 is produced by a machine that injects the plastic into the mold around the tool instead of being pressed into a mold. It is appreciated that using this manufacturing method provides for the mobile device case to be manufactured with a smaller sealing area and thus a smaller sealing gasket (110) area and thus a smaller area where the gasket (110) seal could malfunction. The only areas of the body portion that are open are the front section 124 where one would typically interact with the touch screen, a section near where a charging cable would connect to the mobile device, openings to accommodate the button assemblies 104, 105, and optionally a section where an interchangeable lens may be mounted to the case Although, this tool insertion extruding method is not new, it has not been used to manufacture mobile device cases. The process can be quite expensive and complicated. Thus, a person in the phone case industry would not normally use this methodology due to the overhead costs for this process.

Accordingly, it is appreciated that some or all of the parts could be manufactured using other manufacturing methods. For example, the bottom portion 102 can instead of being manufactured using the tool insert method, it can instead be made using other methods such as, for example, mold injection or dual mold injection. Mold injection can be used to manufacture the bottom portion 102 and the gasket 110 could then be placed inside a crevice in the bottom portion 102. Alternatively, dual mold injection could be used to manufacture the bottom portion 102 and the gasket 110 can be directly molded into place using the dual mold injection method.

Also disclosed is a method of operating a device, the method comprising disposing a mobile device 114 in the device case 100. The disposing may comprise placing the device in the case, closing the case so that the body portion 101 and the bottom portion 102 contact and the gasket 110 forms a watertight seal, and securing the case in the closed configuration with the clasp 107 of a lock arrangement 106. The locking arrangement can be either one lock on one side or the device case or two locking arrangements 106a, 106b on two sides of the device case. Because the case is waterproof, once closed it may be submerged in water without damage to the device.

In this disclosure some but not all embodiments of this disclosure are described. The mobile device case of this disclosure may be embodied in many different forms, shapes and sizes and is not to be construed as limited to the embodiments set forth herein; rather, these embodiments are provided so that this disclosure will fully convey the scope of the invention to those skilled in the art. For example, the mobile device case can be provided either with or without an interchangeable lens and lens mount. In addition, the mobile device case be sized and arranged to accommodate different manufacturer phones such Apple, Samsung, etc. and different models such as, for example, an Apple iPhone 7S or an iPhone 7s plus.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

What is claimed is:

1. A mobile device case comprising:
   a body portion
   a bottom portion including a gasket configured to sealingly contact both the body portion and the bottom portion,
   the body portion and the bottom portion including a connection arrangement configured to connect at least a first side of the body portion to a first side of the bottom portion, the connecting arrangement including at least a first locking arrangement disposed in part on the first side of the body portion and the first side of the bottom portion, the locking arrangement including a clasp configured to hold the body portion and the bottom portion in a closed configuration; and
   wherein the connection arrangement further includes one of a hinge arrangement on a second side of the bottom portion and a second side of the body portion and a second locking arrangement on a second side of the bottom portion and second side of the body portion, and wherein the connection arrangement provides for the bottom portion to be removably attached to the body portion.

2. The device case of claim 1, wherein the body portion comprises a curved portion and the bottom portion comprises a mating curved portion.

3. The device case of claim 2, wherein the gasket comprises a curved gasket.

4. The device case of claim 1, wherein the first locking arrangement and the hinge provide for the bottom portion to be removably attached to the body portion.

5. The device case of claim 1, wherein the first locking arrangement and the second locking arrangement provide for the bottom portion to be removably attached to the body portion.

6. The device case of claim 1, wherein the gasket comprises a substantially flat gasket.

7. The device case of claim 1, wherein at least one of the body portion and the bottom portion comprises a polycarbonate.

8. The device case of claim 7, wherein at least one of the body portion and the bottom portion comprises an acrylonitrile-butadiene-styrene polycarbonate blend.

9. The device case of claim 1, wherein the gasket comprises a curved gasket configured to fluidly seal the top portion and the bottom portion.

10. The device case of claim 9, wherein the connection arrangement in combination with the body portion, the bottom portion and the curved gasket are configured to maintain a watertight seal to a depth of at least 2 meters.

11. The device case of claim 9, wherein the connection arrangement in combination with the body portion, the bottom portion and the curved gasket are configured to maintain a watertight seal to at least a depth of 30 meters.

12. The device case of claim 1, wherein the body portion further comprises at least one button that is configured to movably protrude into the body portion.

13. The device case of claim 12, wherein the button further comprises a biasing member, which biases a position of the button between a rest position and an actuated position.

14. The device claim case of claim 13, wherein the biasing member is a spring.

15. The device case of claim 12, wherein the button comprises a compliant cover.

16. The device case of claim 1, wherein the first locking arrangement is configured to lock the clasp in a closed position.

17. The device case of claim 1, further comprising a flange disposed on a side of the device case.

18. The device case of claim 1, further comprising a lens mount on the body portion.

19. The device case of claim 16, further comprising a removable optical lens configured to be removably attachable to the lens mount.

20. The device case of claim 1, further comprising a bracket, wherein the bracket is sized and configured to securely hold the mobile device.

21. The device case of claim 20, wherein the bracket is sized and configured to position a screen of a mobile device disposed in the body portion adjacent an inner surface of a film layer in the body portion.

22. The device case of claim 21, wherein the film layer is a thin film layer that is configured to allow a user to interact with a mobile device through the thin film layer.

23. The device case of claim 21, wherein the film layer is a thick film layer that is configured to use the mobile device case to up to 30 meters.

24. The device case of claim 21, wherein the bracket is configured with rods and the bottom portion of the device case is configured with mating holders, so that the bracket is removably connectable and disconnectable from the bottom portion.

25. A method of operating a mobile device, the method comprising:
   providing the mobile device case including a body portion having a film layer, a bottom portion, a gasket configured to sealingly contact both the body portion and the bottom portion, and a connection arrangement, the connection arrangement including a first locking arrangement disposed on a first side of the body portion and the first side of the bottom portion, the locking arrangement including a clasp configured to hold the body portion and the bottom portion in a closed configuration and that provides for the bottom portion to be removably attached to the body portion, and a bracket sized and configured to securely hold the mobile device;
   disposing a mobile device in the bracket;
   inserting the mobile device and bracket into the body portion of the mobile device case so that the bracket positions a screen of a mobile device adjacent an inner surface of the film layer in the body portion, and
   operating the mobile device through the film layer of the body portion of the device case.

26. The method of claim 25, further comprising providing the device case with at least one button that is arranged to be aligned with a volume button of the mobile device and that is configured to movably protrude into the body portion, the button further comprises a biasing member that biases a position of the button between a rest position and an actuated position, and actuating the button of the device case to actuate a volume button of the mobile device.

27. The method of claim 25, further comprising closing the device case to form a water tight mobile device case, wherein the closing the device case comprises positioning the bottom portion in a closed position with respect to the body portion and positioning the clasp of at least the first locking assembly in a closed position.

28. The method of claim 26, further comprising submerging the closed mobile device case underwater and operating the mobile device.

29. A system comprising:
The mobile device case of claim 1; and
a mobile device.

30. A mobile device case comprising:
a body portion having a curved portion;
a bottom portion having a mating curved portion and further including a curved gasket configured to sealingly contact the curved portion of the body portion and the curved portion of the bottom portion,
the body portion and the bottom portion including at least in part a first locking arrangement disposed in part of a first side of the body portion and a first side of the curved bottom portion and configured to connect a first side of the body portion to a first side of the bottom portion; and
the body portion and the curved bottom portion including second locking arrangement disposed in part on a second side of the body portion and a second side of the curved bottom portion, the second locking arrangement including a clasp configured to hold the body portion and the bottom portion in a closed configuration.

* * * * *